(12) United States Patent
Terado

(10) Patent No.: US 10,224,527 B2
(45) Date of Patent: Mar. 5, 2019

(54) NON-AQUEOUS ELECTROLYTE SECONDARY BATTERY

(71) Applicant: NISSAN MOTOR CO., LTD., Yokohama-shi, Kanagawa (JP)

(72) Inventor: Miyuki Terado, Yokohama (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 228 days.

(21) Appl. No.: 14/381,077

(22) PCT Filed: Jan. 29, 2013

(86) PCT No.: PCT/JP2013/051886
§ 371 (c)(1),
(2) Date: Aug. 26, 2014

(87) PCT Pub. No.: WO2013/129009
PCT Pub. Date: Sep. 6, 2013

(65) Prior Publication Data
US 2015/0017510 A1  Jan. 15, 2015

(30) Foreign Application Priority Data
Feb. 28, 2012  (JP) ................................ 2012-042134

(51) Int. Cl.
*H01M 2/14* (2006.01)
*H01M 10/0525* (2010.01)
(Continued)

(52) U.S. Cl.
CPC ......... *H01M 2/1686* (2013.01); *H01M 2/145* (2013.01); *H01M 2/166* (2013.01);
(Continued)

(58) Field of Classification Search
CPC .... H01M 2/1686; H01M 2/145; H01M 2/166; H01M 2/1653; H01M 4/131; H01M 10/0525; H01M 2004/021; H01M 2220/20
(Continued)

(56) References Cited

U.S. PATENT DOCUMENTS 8,404,386 B2   3/2013  Kimura
2006/0194116 A1*  8/2006  Suzuki ................. H01M 2/166
                                                     429/251
(Continued)

FOREIGN PATENT DOCUMENTS

CN   1862866 A    11/2006
EP   1 052 718 A1  11/2000
(Continued)

*Primary Examiner* — Magali P Slawski
*Assistant Examiner* — Kourtney R S Carlson
(74) *Attorney, Agent, or Firm* — Foley & Lardner LLP

(57) ABSTRACT

A non-aqueous electrolyte secondary battery of the invention has a power generating element with a single-cell layer which comprises a positive electrode including a positive electrode active material layer formed on a surface of a positive electrode collector, a negative electrode including a negative electrode active material layer formed on a surface of a negative electrode collector and a separator disposed between the positive electrode the negative electrode and containing a non-aqueous electrolyte, in which a value RA (=Rzjis (2)/Rzjis(1)) for the ratio between the surface roughness (Rzjis(1)) of the surface of the negative electrode active material layer on the side in contact with the separator and the surface roughness (Rzjis(2)) of the surface of the separator on the side in contact with the negative electrode active material layer is 0.15 to 0.85.

4 Claims, 2 Drawing Sheets

(51) Int. Cl.
    *H01M 2/16*     (2006.01)
    *H01M 4/131*     (2010.01)
    *H01M 4/02*     (2006.01)

(52) U.S. Cl.
    CPC ......... H01M 2/1653 (2013.01); H01M 4/131 (2013.01); H01M 10/0525 (2013.01); *H01M 2004/021* (2013.01); *H01M 2220/20* (2013.01); *Y02E 60/122* (2013.01); *Y02T 10/7011* (2013.01)

(58) Field of Classification Search
    USPC ................. 429/129–147, 246, 247, 251, 163
    See application file for complete search history.

(56) References Cited

U.S. PATENT DOCUMENTS

| | | | | |
|---|---|---|---|---|
| 2006/0269842 | A1* | 11/2006 | Ichinose | H01M 2/0207 |
| | | | | 429/247 |
| 2009/0011338 | A1 | 1/2009 | Kimura | |
| 2011/0300430 | A1* | 12/2011 | Usami | H01M 2/1653 |
| | | | | 429/144 |

FOREIGN PATENT DOCUMENTS

| | | |
|---|---|---|
| EP | 2 352 188 A1 | 8/2011 |
| JP | 11-80395 A | 3/1999 |
| JP | 2005-246966 A | 9/2005 |
| JP | 2008-123954 A | 5/2008 |
| JP | 2010-0123383 A | 6/2010 |
| JP | 2010-218749 A | 9/2010 |
| WO | WO 2010/074151 A1 | 7/2010 |

* cited by examiner

NON-AQUEOUS ELECTROLYTE SECONDARY BATTERY

TECHNICAL FIELD

The present invention relates to a non-aqueous electrolyte secondary battery.

BACKGROUND ART

Recently, due to increased direction to environmental preservation, electric vehicles (EV), hybrid electric vehicles (HEV) and fuel cell vehicles (FCV) are being developed. As a motor drive power source of these vehicles, a repeatedly rechargeable secondary battery is suitable. Particularly, non-aqueous electrolyte secondary batteries, such as lithium-ion secondary battery expecting a high capacity and high output are attracting public attention.

The non-aqueous electrolyte secondary battery has, as a component part, a power generating element that comprises laminated single-cell layers each including a positive electrode, a negative electrode and an electrolyte layer disposed between the positive and negative electrodes.

As the electrolyte layer, a structure including a separator made of a microporous resin sheet and a non-aqueous electrolyte such as liquid electrolyte or gel electrolyte held in the separator is known. In case of the lithium-ion secondary battery, the non-aqueous electrolyte contains organic solvent and lithium salt as essential components.

The separator that constitutes the electrolyte layer in each single-cell layer requires both a function to hold the non-aqueous electrolyte to secure an ion conductivity between the positive and negative electrodes and a function to serve as a partition wall between the positive and negative electrodes. Furthermore, in order to stop a charging/discharging reaction when the battery becomes a high temperature, it is desirable that the separator has a function to stop migration of ion, and hitherto, as such separator, a microporous film made of thermoplastic resin such as polyolefine or the like has been used.

However, in case of using a separator made of a soft material such as the polyolefine, there was a possibility that foreign pieces led into the battery during production of the battery and fragments of the electrode active material layer peeled from the electrodes would pass through the separator to induce undesirable internal short circuit.

In order to solve the above-mentioned problem, Patent Document-1 proposes an idea in which for suppressing such internal short circuit, a porous film made of a polyolefine or the like has at least one surface thereof a breathable surface protection layer (heat resistant insulating layer) including inorganic fine particles.

As a major step for manufacturing the non-aqueous electrolyte secondary battery having the above-mentioned structure, there is a process (lamination process) for producing a power generating element by laminating a plurality of single-cell layers each being produced by alternately laminating electrodes (positive electrode and negative electrode) and a separator. In this lamination process, the elements to be laminated should be precisely laminated or positioned in a lamination direction in order to prevent a lamination misalignment in a surface direction. If, in this lamination process, the elements are subjected to such a lamination misalignment, the active materials contained in the active material layers fail to be adequately used for the charging/discharging reaction, resulting in that a desired charging/discharging capacity is not obtained.

However, hitherto, means for sufficiently suppressing the above-mentioned lamination misalignment has not been known. According to the investigation by the inventor, it has been revealed that the lamination misalignment of the above-mentioned type takes place notably in an interface between the negative electrode active material layer and the separator.

PRIOR ART DOCUMENTS

Patent Documents

Patent Document 1: Japanese Laid-open Patent Application (tokkaihei) 11-80395

SUMMARY OF INVENTION

The present invention aims to provide a means for effectively suppressing a lamination misalignment in the lamination process during the production of a non-aqueous electrolyte secondary battery.

In order to solve the above-mentioned lamination misalignment in the lamination process, earnest and intensive investigation has been made by the inventor. As a result of that investigation, the inventor has found that the above-mentioned problem can be solved by, in two elements that constitute an interface between the mutually contacting negative electrode active material layer and separator, controlling a value for a ratio between a surface roughness of one of the elements and that of the other one of the elements to a predetermined range.

A non-aqueous electrolyte secondary battery of an embodiment of the present invention, which was completed in the above-mentioned manner, has a power generating element with a single-cell layer which includes a positive electrode including a positive electrode active material layer formed on a surface of a positive electrode collector, a negative electrode including a negative electrode active material layer formed on a surface of a negative electrode collector, and a separator disposed between the positive electrode active material layer and the negative electrode active material layer in a manner to contact to the negative electrode active material layer, the separator having therein a non-aqueous electrolyte. Furthermore, in this non-aqueous electrolyte secondary battery, a value (which will be referred to as a surface roughness ratio) $R_A$ $(=Rzjis(2)/Rzjis(1))$ for the ratio between the surface roughness $(Rzjis(1))$ of the surface of the negative electrode active material layer on the side in contact with the separator and the surface roughness $(Rzjis(2))$ of the surface of the separator on the side in contact with the negative electrode active material layer is 0.15 to 0.85.

In the non-aqueous electrolyte secondary battery of the embodiment of the present invention, a dynamic friction coefficient between the negative electrode active material layer and the separator is controlled to a relatively large value. As a result, the lamination misalignment, which would occur in the lamination step during production of the non-aqueous electrolyte secondary battery, particularly in the step of laminating the negative electrode active material layer and the separator, can be effectively suppressed.

EMBODIMENT FOR CARRYING OUT INVENTION

Figure 1:
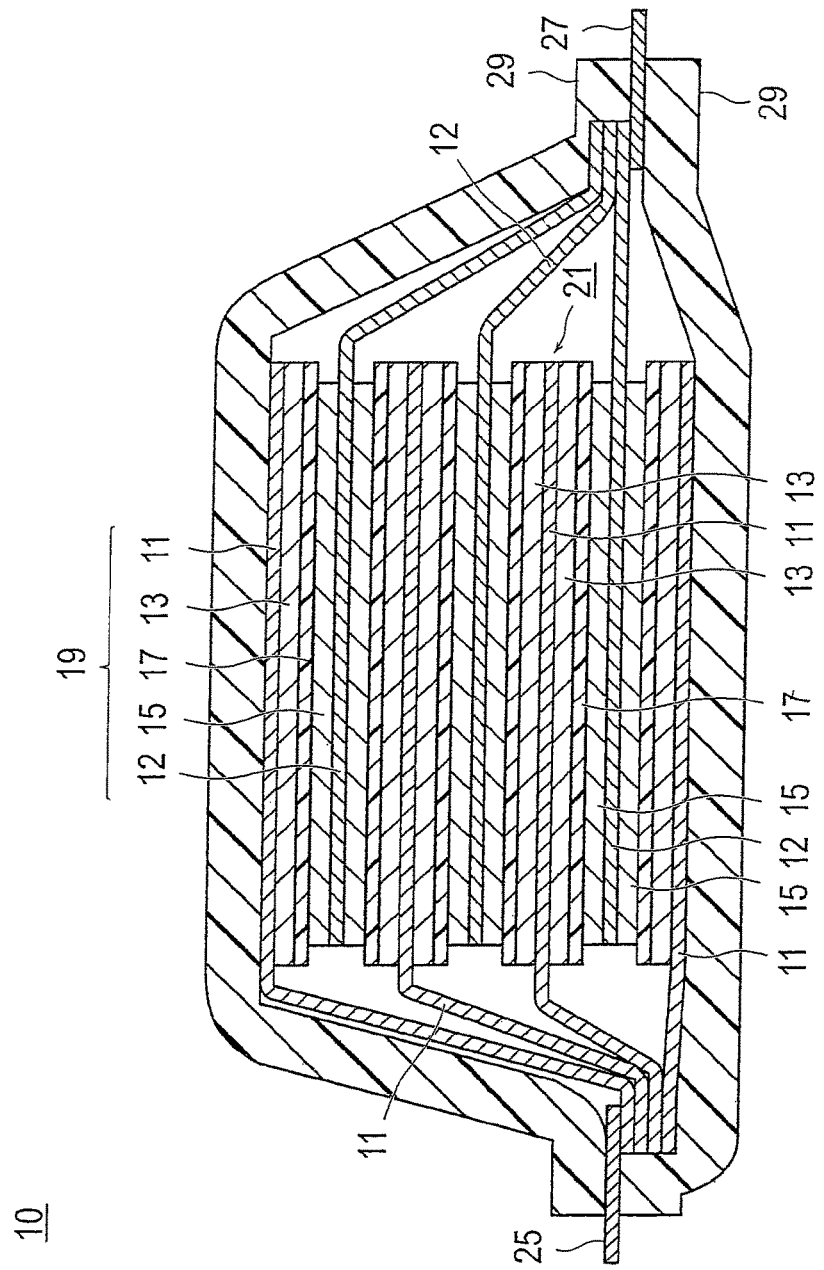
FIG. 1 is a schematically illustrated sectional view of a lithium-ion secondary battery that is an embodiment of the present invention.

In the following, an embodiment of the present invention will be described with reference to the attached drawings. In the drawings, the same elements are denoted by the same numeral references and repeated explanation on them will be omitted in the following description. A dimension ratio of the drawings is exaggerated for convenience of explanation, and thus, there are cases where the dimension ratio differs from an actual dimension ratio.

In case of classifying the non-aqueous electrolyte secondary battery with respect to the shape/structure, various types are listed up, which are for example a laminated type (flat type) battery, a winding type (cylinder type) battery, etc. Although any of them is applicable in the invention, in accordance with the present invention, a non-aqueous electrolyte secondary battery having a flat laminate type (flat type) battery construction can exhibit the most remarkable effect. Accordingly, in the following explanation, for explaining the non-aqueous electrolyte secondary battery having the flat laminate type (flat type) battery construction, a lithium-ion secondary battery will be described as one example of the invention.

FIG. 1 is a schematically illustrated sectional view of a lithium-ion secondary battery that is an embodiment of the present invention.

As is seen from FIG. 1, the lithium-ion secondary battery 10 of the embodiment has such a construction that a generally rectangular power generating element 21 that actually carries out the charging/discharging reaction is hermetically enclosed in a laminate sheet 29 that serves as an exterior member. More specifically, by using a polymer-metal composite laminated sheet as an exterior member of the battery and joining entire peripheral portions of the exterior member through heat fusion, there is produced a construction in which the power generating element 21 is hermetically enclosed in the exterior member.

The power generating element 21 has such a construction that a negative electrode including a negative electrode collector 11 that has at both surfaces thereof negative electrode active material layers 13, a separator 17 and a positive electrode including a positive electrode collector 12 that has at both surfaces thereof positive electrode active material layers 15 are laminated or piled. More specifically, the negative electrode, the separator and the positive electrode are laminated in this order so that one negative electrode active material layer 13 and one adjacent positive electrode active material layer 15 are arrange to face each other through the separator 17. It is to be noted that the separator 17 has a non-aqueous electrolyte (for example, liquid electrolyte) built therein.

Thus, the adjacent negative electrode, separator and positive electrode constitute a single-cell layer 19. Thus, due to lamination of a plurality of the single-cell layers 19, it can be said that the lithium-ion secondary battery 10 of the embodiment has such a construction as to establish an electric parallel connection. The outermost negative electrode collectors arranged at the outermost layers of the power generating element 21 have each at only one surface the negative electrode active material layer 13. If desired, by arranging, at the outermost layers of the power generating element 21, the outermost positive electrode collectors reversing the arrangement of the negative and positive electrodes relative to the arrangement shown in FIG. 1, a usable modification may be provided in which only one of the surfaces of each of the outermost positive electrode collectors has the positive electrode active material layer arranged thereon. Of course, in case where, as is shown in FIG. 1, the negative electrodes are arranged at the outermost layers of the power generating element 21, both surfaces of each of the outermost negative electrode collectors may be applied with the negative electrode active material layer. However, in this case, the negative electrode active material layers placed at the outermost layers of the power generating element are prevented from functioning.

To the negative electrode collectors 11 and the positive electrode collectors 12, there are respectively fixed a negative electrode collector plate 25 and a positive electrode collector plate 27 that are conducted to respective electrodes (viz., positive electrode and negative electrode). Each of these electrode collector plates 25 and 27 is extended to the outside of the laminate sheet 29 after being tightly put between end portions of the laminate sheet 29. If desired, the negative electrode collector plate 25 and positive electrode collector plate 27 may be connected through negative and positive electrode leads (not shown) to the negative electrode collectors 11 and positive electrode collectors 12 by ultrasonic welding, resistance welding or the like.

[Surface Roughness Ratio]

The lithium-ion secondary battery 10 of the embodiment is characterized in that a surface roughness ratio $R_A$ (=Rzjis (2)/Rzjis(1)), which is defined as a value for the ratio of a surface roughness (Rzjis(2)) of one surface of the separator 17 that contacts the negative electrode active material layer 13 relative to a surface roughness (Rzjis(1)) of one surface of the negative electrode active material layer 13 that contacts the separator 17, is 0.15 to 0.85.

Now, it is to be noted that the surface roughness (Rzjis) is a parameter called "ten-point average roughness" and measured by a method that will be explained in a hereinafter described embodiment. As $R_A$, values in the above-mentioned range are usable. Preferably, $R_A$ is equal to or smaller than 0.6, more preferably, equal to or smaller than 0.5, more preferably, equal to or smaller than 0.4, much preferably, equal to or smaller than 0.3 and most preferably, equal to or smaller than 0.25. Although the lower limit value of $R_A$ is not especially limited, a value equal to or larger than 0.2 is usable in view of possibility of realization.

As is described hereinabove, when the value of $R_A$ is within the range from 0.15 to 0.85, the dynamic friction coefficient established between the negative electrode active material layer and the separator is controlled to a relatively large value as will be proved in a section of an after-mentioned embodiment. As a result, in the lamination step at the time when the non-aqueous electrolyte secondary battery is manufactured, occurrence of lamination misalignment at the time when the negative electrode active material layer and the separator are laminated can be effectively suppressed.

In a preferred embodiment of the present invention, in addition to the above-mentioned $R_A$, a surface roughness ratio between the positive electrode active material layer and the separator is also controlled. More specifically, in the non-aqueous electrolyte secondary battery of the present invention, a surface roughness ratio $R_B$ (=Rzjis (4)/Rzjis(3)), which is defined as a value of a ratio of a surface roughness (Rzjis(4)) of one surface of the separator 17 that contacts the positive electrode active material layer 15 relative to a surface roughness (Rzjis(3)) of one surface of the positive electrode active material layer 15 that contacts the separator 17, is 0.15 to 1.5.

When the value of $R_B$ is within the above-mentioned range, the dynamic friction coefficient established between the negative electrode active material layer and the separator and the dynamic friction coefficient established between the positive electrode active material layer and the separator have mutually close values, so that there is accomplished a construction in which a similar slipperiness is provided between the positive and negative electrodes, as will be proved in a section of an after-mentioned embodiment. In general, in the lamination step at the time when the non-aqueous electrolyte secondary battery is manufactured, an absolute value of the slipperiness (viz., dynamic friction coefficient) between the active material layer and the separator is an important factor to be considered. However, in parameters, such as the dynamic friction coefficient, it is preferable that balance is established between the positive and negative electrodes in view of the productivity. Although the value of $R_B$ is possible in the above-mentioned range, preferably, the value is equal to or larger than 0.5, more preferably, the value is from 0.5 to 1.25, more preferably, the value is from 0.5 to 0.8 and much more preferably, the value is from 0.5 to 0.6. In the other preferred embodiment, the value of $R_B$ is larger than that of $R_A$. When the battery of the invention has the above-mentioned constructions, the effects of the invention can be more prominently exhibited.

For controlling the surface roughness ratio ($R_A$, $R_B$) to the above-mentioned preferable range, there is no specific limitation in selecting method. That is, a common general knowledge at the time when the present application is filed can be suitably cited. As one example for controlling the surface roughness of the surface of the active material layer, there is exemplified a method in which the particle size of the active material contained in the active material layer is adjusted. In this case, if the particle size of the active material is increased, the surface roughness of the surface of the active material layer can be increased. As another example for controlling the surface roughness of the active material, there is a method in which a flatness of the surface of the active material layer is controlled by suitably adjusting a condition of a pressing treatment that may be effected at the time of forming the active material layer.

While, as a method for controlling the surface roughness of the separator surface, there is exemplified a method in which, when an after-mentioned heat resistant insulating layer-mounted separator (see FIG. 2) is used, BET specific surface area and particle size of inorganic particles contained in the heat resistant insulating layer are adjusted. In this case, when the BET specific surface area and the particle size of inorganic particles contained in the heat resistant insulating layer are increased, the surface roughness of the separator surface can be increased. Furthermore, when members (for example, a resin film or the like) other than the heat resistant insulating layer-mounted separator are used as the separator, the surface roughness of the separator surface can be controlled by employing a method in which a compression is effected by a pressure roll at a temperature below the melting point of the resin.

In the following, components of the above-mentioned lithium-ion secondary battery will be described. However, the present invention is not limited to the embodiment described below.

[Negative Electrode (Negative Electrode Active Material Layer)]

The negative electrode has such a construction that a negative electrode active material layer 13 is formed on each surface of a negative electrode collector 11.

The negative electrode collector 11 is a member that electrically connects the negative electrode active material layers 13 to an external member and is constructed of an electrically conductive material. Concrete construction of the collector is not specially limited. An after-mentioned construction of the positive electrode collector 12 is similarly usable.

The negative electrode active material layer 13 contains a negative electrode active material and may contain, when necessary, an electrically conductive material for increasing the electric conductivity thereof and a binder. The negative electrode active material layer 13 may contain an electrolyte.

The negative electrode active material is not especially limited so long as it is made of a material that is able to occlude and discharge lithium. Examples of the negative electrode active material are metals, such as Si, Sn and the like, metallic oxides, such as TiO, $Ti_2O_3$, $TiO_2$ or $SiO_2$, SiO, $SnO_2$ and the like, complex oxides made of lithium and transmission metal, such as $Li_{4/3}Ti_{5/3}O_4$, $Li_7MnN$ and the like, Li—Pb based alloys, Li—Al based alloys, Li, and carbon materials such as natural graphite, artificial graphite, carbon black, activated carbon, carbon fiber, cokes, soft carbon, hard carbon and the like. Preferably, the negative electrode active material contains elements that can be alloyed with lithium. With usage of the elements that can be alloyed with lithium, it is possible to obtain a high capacity and high output battery that has a high energy density as compared with a conventional battery of carbon-based material. The above-mentioned negative electrode active materials may be used singly or as a mixture of two or more of the materials.

Examples of the elements that can be alloyed with lithium are Si, Ge, Sn, Pb, Al, In, Zn, H, Ca, Sr, Ba, Ru, Rh, Ir, Pd, Pt, Ag, Au, Cd, Hg, Ga, Tl, C, N, Sb, Bi, O, S, Se, Te and Cl, but in the invention, the elements are not limited to these listed ones. When considering from an aspect of the possibility of producing a battery that is excellent in capacity and energy density, among the listed elements, it is preferable to contain at least one or more elements selected from a group consisting of carbon material, and/or Si, Ge, Sn, Pb, Al, In and Zn, and it is particularly preferable to contain the carbon material, Si or Sn. These elements may be used singly or two or more elements may be simultaneously used.

The mean particle size of the negative electrode active material is not especially limited. However, when considering from an aspect of increasing the capacity, reactivity and cycle durability of the negative electrode active material, the mean particle size is preferably 1 to 100 μm, and more preferably 1 to 20 μm. Within such ranges, increase of internal resistance of the secondary battery at the time of charging/discharging under a high output condition is suppressed, and thus, sufficient electric current can be obtained. When the negative electrode active material is of a secondary particle, it is preferable that the mean particle size of primary particles that constitute the secondary particles is within a range from 10 nm to 1 μm. However, in the invention, the mean particle size is not necessarily limited to the above-mentioned range. However, even though it depends on the production method, the negative electrode active material needs not be the material that has been formed to the secondary particle by condensation, agglomeration and the like. The particle size of the negative electrode active material and the particle size of the primary particle adopt the mode diameter that is measured by a laser diffraction/scattering method. The shape of the negative electrode active material differs depending on the type and the production method of the material. Examples of the shape are a spherical shape (powdered shape), a tabular shape, a needle shape, a prism shape, a corn shape and the like. However, the shape is not limited to such shapes. That is, any shape is employable without any problems. But, preferably, selection should be made in the shapes that are the most suitable for enhancing the battery characteristics such as charging/discharging characteristic and the like.

The electrically conductive material is contained for the purpose of improving the electrical conductivity of the active material layer. The electrically conductive material used in this embodiment is not especially limited. That is, known electrically conductive materials can be suitably used. Examples of the conductive materials are carbon blacks such as acetylene black, furnace black, channel black, thermal black and the like; carbon fibers such as vapor-grown carbon fiber (VGCF) and the like; and carbon materials such as graphite and the like. When the active material layer contains the electrically conductive material, electron networks are effectively produced in the active material layer and thus, the output characteristics of the battery are improved.

(Binder)

Examples of the binder are not limited to those listed below. However, preferable examples are thermoplastic resins such as polyvinylidine fluoride (PVDF), carboxymethyle cellulose (CMC), polytetrafluoroethylene (PTFE), polyvinyl acetate, acrylic resin (for example, LSR and the like) and the like; thermosetting resins such as polyimide, epoxy resin, polyurethane resin, urea resin and the like; and rubber-based materials such as styrene-butadiene rubber (SBR) and the like.

The concrete value of the surface roughness (Rzjis(1)) of the negative electrode active material layer 13 that contacts the separator 17 is not especially limited. That is, the surface roughness can be suitably adjustable so long as it satisfies the above-mentioned regulations. However, preferably, Rzjis(1) is 3.0 to 10.0 μm, and more preferably, 3.0 to 6.0 μm.

[Positive Electrode (Positive Electrode Active Material Layer)]

The positive electrode has such a construction that a positive electrode active material layer 15 is formed on each surface of a positive electrode collector 12.

The positive electrode collector 12 is a member that electrically connects the positive electrode active material layers 15 to an external member and is constructed of an electrically conductive material. Concrete construction of the collector is not specially limited. The material of the collector is not especially limited so long as the material has an electric conductivity. That is, known conductive materials that have been used in common lithium-ion secondary batteries can be used. As a material of the collector, metals and electrically conductive polymers can be used. More specifically, examples of the material are iron, chromium, nickel, manganese, titanium, molybdenum, vanadium, niobium, cupper, silver, platinum, stainless steel, carbon and the like. These materials may be used singly, or as alloyed type or complex. It is to be noted that a structure having such a construction that an electrically conductive filler is dispersed in a base material made of nonconductive polymer can be used as one example of the collectors. The thickness of the collector is not especially limited, but, normally, the thickness is 1 to 100 μm. The size of the collector is decided in accordance with an intended use of the lithium-ion secondary battery.

The positive electrode active material layer 15 contains a positive electrode active material and may contain, when necessary, an electrically conductive material for increasing the electric conductivity thereof and a binder. The positive electrode active material layer 15 may contain an electrolyte.

The positive electrode active material is not especially limited so long as it is made of a material that is able to occlude and discharge lithium. Positive electrode active materials usually used in lithium-ion secondary battery can be used. More specifically, lithium-transition metal compound oxides are preferable, and examples of them are Li—Mn based compound oxides such as $LiMn_2O_4$ and the like, Li—Ni based compound oxides such as $LiNiO_2$ and the like, and Li—Ni—Mn based compound oxides such as $LiNi_{0.5}Mn_{0.5}O_2$ and the like. In some cases, two or more of the above-mentioned examples of the positive electrode active material are usable together.

The mean particle size of the positive electrode active material is not especially limited. However, when considering from an aspect of increasing the capacity, reactivity and cycle durability of the positive electrode active material, the mean particle size is preferably 1 to 100 μm, and more preferably 1 to 20 μm. Within such ranges, increase of internal resistance of the secondary battery at the time of charging/discharging under a high output condition is suppressed, and thus, sufficient electric current can be obtained. When the positive electrode active material is of a secondary particle, it is preferable that the mean particle size of primary particles that constitute the secondary particles is within a range from 10 nm to 1 μm. However, in the invention, the mean particle size is not necessarily limited to the above-mentioned range. However, even though it depends on the production method, the positive electrode active material needs not be the material that has been formed to the secondary particle by condensation, agglomeration and the like. The particle size of the positive electrode active material and the particle size of the primary particle adopt the mode diameter that is measured by a laser diffraction/scattering method. The shape of the positive electrode active material differs depending on the type and the production method of the material. Examples of the shape are a spherical shape (powdered shape), a tabular shape, a needle shape, a prism shape, a corn shape and the like. However, the shape is not limited to such shapes. That is, any shape is employable without any problems. But, preferably, selection should be made in the shapes that are the most suitable for enhancing the battery characteristics such as charging/discharging characteristic and the like.

Since examples of the electrically conductive material and the binder which are to be contained in the positive electrode active material layer 15 are those explained in the section of the negative electrode active material layer 13, detailed explanation of them will be omitted.

The concrete value of the surface roughness (Rzjis(3)) of the positive electrode active material layer 15 that contacts the separator 17 is not especially limited. That is, the surface roughness can be suitably adjustable so long as it satisfies the above-mentioned regulations. However, preferably, Rzjis(3) is 1.5 to 3.5 μm, and more preferably, 2.0 to 3.0 μm.

[Separator]

The separator 17 functions as a spatial partition wall (spacer) that is provided between the negative electrode active material layer 13 and the positive electrode active material layer 15. In addition to such function, the separator can function as means that holds therein a non-aqueous electrolyte or medium through which lithium ion moves between the positive and negative electrodes at the time of charging/discharging.

As is mentioned hereinabove, the separator 17 holds therein the non-aqueous electrolyte. The concrete form of the non-aqueous electrolyte held in the separator 17 is not especially limited. That is, as the non-aqueous electrolyte, liquid electrolyte and polymer gel electrolyte can be used.

The liquid electrolyte is obtained by dissolving lithium salt in organic solvent. Examples of the organic solvent are dimethyl carbonate (DMC), diethyle carbonate (DEC), dipropyl carbonate (DPC), ethylmethyl carbonate (EMC), methyl propionate (MP), methyl acetate (MA), methyl formate (MF), 4-methyldioxolane (4MeDOL), dioxolane (DOL), 2-methyltetrahydrofuran (2MeTHF), tetrahydrofuran (THF), dimethoxyethane (DME), ethylene carbonate (EC), propylene carbonate (PC), butylene carbonate (BC), γ-butyrolactone (GBL) and the like. These solvents may be used singly or as a mixture of two or more of the solvents.

The type of the lithium salt is not especially limited. However, examples of the lithium salt are inorganic acid anion salts such as $LiPF_6$, $LiBF_4$, $LiClO_4$, $LiAsF_6$, $LiTaF_6$, $LiSbF_6$, $LiAlCl_4$, $Li_2B_{10}Cl_{10}$, $LiI$, $LiBr$, $LiCl$, $LiAlCl$, $LiHF_2$, $LiSCN$ and the like and organic acid anion salts such as $LiCF_3SO_3$, $Li(CF_3SO_2)_2N$, LiBOB (lithiumbisoxideborate), LiBETI (lithiumbis (perfluoroethylenesulfonylamide); which is also represented by $Li(C_2F_6SO_2)_2N$) and the like. These lithium salts may be used singly or as a mixture of two or more of the lithium salts.

While, the gel electrolyte is obtained by pouring the above-mentioned liquid electrolyte into a matrix polymer that has a lithium ion conductivity. Examples of the lithium ion conducting matrix polymer are polymers (PEO) that have polyethylene oxide in a main or side chain, polymers (PPO) that have polypropylene oxide in a main or side chain, polyethylene glycol (PEG), polyacrylonitrile (PAN), polymethacrylic ester, polyvinylidene fluoride (PVdF), polyvinylidene fluoride-hexafluoropropylene copolymer (PVdF-HFP), polyacrylonitrile (PAN), poly(methylacrylate) (PMA), poly(methyl methacrylate) (PMMA) and the like. In addition to the above-mentioned polymers, a mixture of the polymers, modified one, derivative, random copolymer, alternating copolymer, graft copolymer, block copolymer and the like can be used. Among them, usage of PEO, PPO, PEO-PPO copolymer, PVdF or PVdF-HFP is preferable. The lithium salts are well dissolved in such matrix polymers. The matrix polymers of the polymer gel electrolyte can exhibit excellent mechanical strength when having a crosslinked structure. In order to provide the matrix polymers with such crosslinked structure, it is only necessary that, with the aid of a suitable polymerization initiator, a polymirizable polymer (for example, PEO and PPO) prepared for producing a polymer electrolyte is subjected to a polymerization treatment such as thermal polymerization, ultraviolet ray-polymerization, radiation polymerization, electron beam polymerization or the like. The above-mentioned non-aqueous electrolyte may be contained in the active material layer of the electrodes.

While, a concrete member used for forming the separator 17 is a fine porous membrane constructed of for example polyolefine such as polyethylene, polypropylene or the like, hydrocarbon such as polyvinylidene fluoride-hexafluoropropylene copolymer (PVdF-HFP) or the like or glass fiber.

According to the inventor's investigation, it has been revealed that a lamination misalignment appearing on an interface between the negative electrode active material layer and the separator in the lamination step during production of the non-aqueous electrolyte secondary battery is remarkable when a separator with a heat resistant insulating layer (which will be referred to as "heat resistant insulating layer-mounted separator" hereinafter for ease of explanation) disclosed in the above-mentioned Patent Document-1 is practically used, and it has been found that such lamination misalignment, which occurred when the heat resistant insulating layer-mounted separator was practically used, is effectively suppressed when a construction according to the present invention is practically employed. Accordingly, in a preferred embodiment of the present invention, as a separator 17 that constitutes part of the non-aqueous electrolyte secondary battery, a so-called heat resistant insulating layer-mounted separator is used. In the following, the preferred embodiment in case where the separator 17 is the heat resistant insulating layer-mounted separator will be described.

Figure 2:
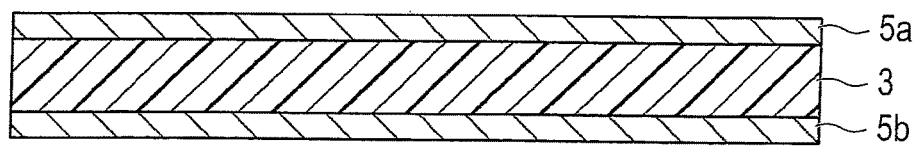
FIG. 2 is a schematically illustrated sectional view of a heat resistant insulating layer-mounted separator.

In FIG. 2, there is shown a schematically illustrated sectional view of the heat resistant insulating layer-mounted separator that is employed in the embodiment. The heat resistant insulating layer-mounted separator 1 shown in FIG. 2 comprises a porous base layer 3 that forms on both surfaces thereof heat resistant insulating layers (5a, 5b). The porous base layer 3 is a fine porous membrane constructed of for example polyethylene. The heat resistant insulating layers (5a, 5b) have each such a construction that alumina particles ($Al_2O_3$) are connected or linked through binder that is for example carboxymethyle cellulose (CMC). Since the heat resistant insulating layers (5a, 5b) have each a porous structure due to presence of spaces or gaps provided by the linked alumina particles, the separator 1 with the heat resistant insulating layers has a porous construction as a whole. Accordingly, the separator 1 with the heat resistant insulating layers functions as a separator that has a lithium ion conductivity as a whole. In the following, construction members of the heat resistant insulating layer-mounted separator shown in FIG. 2 will be described.

(Porous Base Layer)

As is seen from FIG. 2, the porous base layer 3 serves as a base member at the time of forming the heat resistant insulating layers (5a, 5b). Although the material of the porous base layer 3 is not especially limited, resin materials such as thermoplastic resin, thermosetting resin and the like, metallic materials and cellulosic materials can be used. When considering from an aspect of the necessity of providing the heat resistant insulating layer-mounted separator with a shut-down function, it is preferable to use a porous base member made of resin material (which member will be referred to as "resinous porous base layer" hereinafter).

Examples of the resin material that forms the resinous porous base layer are polyethylene (PE), polypropylene (PP), copolymer obtained by copolymerizing ethylene and propylene (ethylene-propylene copolymer), copolymer obtained by copolymerizing ethylene or propylene with monomer other than ethylene and propylene, polystyrene (PS), polyvinyl acetate (PVAc), polyethylene terephthalate (PET), polyvinylidene fluoride (PFDV), polytetrafluoroethylene (PTFE), polysulfone (PSF), polyethersulfone (PES), polyetheretherketone (PEEK), polyimide (PI), polyamidimide (PAI), phenol resin (PF), epoxy resin (EP), melamine resin (MF), urea resin (UF), alkyd resin, polyurethane (PUR) and the like. These resins may be used singly or as a mixture of two or more of the resins.

In order to provide the heat resistant insulating layer-mounted separator with a shut-down function in a temperature range from 120 to 200° C., it is preferable that the resin material for forming the resinous porous base layer contains a resin of which melting temperature is from 120 to 200° C. More specifically, it is preferable to use a resinous porous base layer that contains polyethylene (PE), polypropylene (PP), copolymer obtained by copolymerizing ethylene and propylene (ethylene-propylene copolymer), copolymer obtained by copolymerizing ethylene or propylene with monomer other than ethylene and propylene or the like. When the resin material for forming the resinous porous base layer contains a resin of which melting temperature is from 120 to 200° C., a thermoplastic resin or thermosetting resin of which melting temperature exceeds 200° C. may be used together. In this case, the ratio of the amount of the resin of which melting temperature is from 120 to 200° C. relative to the entire amount of the resinous porous base layer is preferably equal to or larger than 50 wt. %, more preferably equal to or larger than 70 wt. %, much more preferably equal to or larger than 90 wt. %, particularly preferably equal to or larger than 95 wt. %, most preferably 100 wt. %.

Furthermore, a laminated sheet produced by laminating two or more of the above-mentioned resin materials on another may be used as the resinous porous base layer. One example is a resinous porous base layer that has a three-layered structure of PP/PE/PP. Since the melting temperature of PE is 130° C., the resinous porous base layer of three-layered structure can exhibit the shut-down function when the battery temperature reaches 130° C. Even if the battery temperature should increase further, entire surface short-circuiting can be suppressed because the melting temperature of PP is 170° C., and thus, the separator has an enhanced safety.

The shape of the resinous porous base layer is not especially limited, and woven cloth, nonwoven cloth, fine porous membrane and the like are usable. Among them, the fine porous membrane is preferable when considering from an aspect of necessity of obtaining a high lithium ion conductivity. Furthermore, the porosity of the resinous porous base layer is preferably 40 to 85%, more preferably 50 to 70%, much preferably 55 to 60%. By setting the porosity in the above-mentioned ranges, sufficient lithium ion conductivity and strength can be obtained.

The thickness of the resinous porous base layer is not especially limited. However, preferably, the thickness is 1 to 200 μm, more preferably 5 to 100 μm, much preferably 7 to 30 μm, particularly preferably 10 to 20 μm. When this thickness is equal to or larger than 5 μm, the electrolyte has a satisfied retaining property. While, when the thickness is equal to or smaller than 200 μm, excessive increase of the resistance does not easily occur.

(Heat Resistant Insulating Layer)

The heat resistant insulating layer (5a, 5b) is arranged on one surface or both surfaces of the above-mentioned porous base layer, and has a function to reinforce the strength of the separator. Particularly, in case of the resinous porous base layer of which porous base layer is made of resin material, the heat resistant insulating layer plays a part of easing an internal stress which would be produced when the battery temperature increases and plays a part of suppressing deformation of the separator which would be caused by thermal contraction. The heat resistant insulating layer contains inorganic particles and binder.

The inorganic particles contribute to increase the mechanical strength and the thermal contraction suppression effect of the heat resistant insulating layer. The materials used as the inorganic particles are not especially limited. Examples of the materials are oxides of silicon, aluminum, zirconium and titan ($SiO_2$, $Al_2O_3$, $ZrO_2$, $TiO_2$), hydroxides, nitrides and complexes made from these materials. These inorganic particles may be based on mineral resources such as boehmite, zeolite, apatite, kaoline, mullite, spinet, olivine, mica and the like or may be those artificially produced. Furthermore, one kind of these inorganic particles may be used singly or two or more of them may be used together. Among them, usage of silica ($SiO_2$) or alumina ($Al_2O_3$) is preferable when considering from an aspect of cost, and usage of alumina ($Al_2O_3$) is most preferable.

The binder plays a part of binding the inorganic particles together as well as binding the inorganic particles and the resinous porous base layer. Due to the binder, the heat resistant insulating layer is stably formed and separation between the porous base layer and the heat resistant insulating layer is suppressed.

Binders used for the heat resistant insulating layer are not especially limited. That is, commonly used binders are suitably adopted by those skilled in the art. Examples of the binders are compounds such as carboxymethyle cellulose (CMC), polyacrylonitrile, cellulose, ethylene-vinyl acetate copolymer, polyvinyl chloride, styrene-butadiene rubber (SBR), isoprene rubber, butadiene rubber, polyvinylidine fluoride (PVDF), polytetrafluoroethylene (PTFE), polyvinyl fluoride (PVF), methyl acrylate and the like. Among them, usage of carboxymethyle cellulose (CMC), methyl acrylate or polyvinylidine fluoride (PVDF) is preferable. One kind of these compounds may be used singly or two or more of them may be used together.

Preferably, the content of the binder in the heat resistant insulating layer is 2 to 20 wt. % relative to 100 wt. % of the heat resistant insulating layer. When the content of the binder is equal to or larger than 2 wt. %, a peeling resistance between the heat resistant insulating layer and the porous base layer can be increased and a resistance against vibration of the separator can be improved. While, when the content of the binder is equal to or smaller than 20 wt. %, the spaces or gaps between the inorganic particles can be suitably held and thus a sufficient lithium ion conductivity can be obtained.

The thickness of each heat resistant insulating layer is preferably 1 to 20 μm, more preferably 2 to 10 μm, much more preferably 3 to 7 μm. When the heat resistant insulating layer has such thickness, the heat resistant insulating layer-mounted separator is provided with a sufficient mechanical strength and suppressed from having an excessive volume and weight, and thus such thickness is desirable.

In case where the heat resistant insulating layer is provided on both surfaces of the porous base layer, components of the two heat resistant insulating layers may be the same or different. However, when considering from an aspect of easy m handling at the production, it is preferable that the components are the same.

The thickness of the entire construction of the heat resistant insulating layer-mounted separator is not especially limited so long as the construction assures a sufficient strength. However, when considering from an aspect of much downsizing the battery, it is preferable that the thickness is not too large. More specifically, the thickness of the heat resistant insulating layer-mounted separator is preferably 10 to 50 μm, more preferably 15 to 30 μm.

Method of producing the heat resistant insulating layer-mounted separator is not especially limited. That is, the separator can be produced by suitably using and referring to known techniques. In the following, a method of producing a heat resistant insulating layer-mounted separator in case of using a resinous porous base layer as the porous base layer will be described.

In case of producing a fine porous membrane of polyolefine as a resinous porous base member, polyolefine is at first dissolved in a solvent such as paraffin, liquid paraffin, paraffin oil, tetralin, ethylene glycol, glycerin, decalin or the like. Then, it is extruded into a sheet-like object, removing the solvent from the object is made, and then the object is subjected to uniaxial stretching and biaxial stretching (simultaneously or successively) for producing the fine porous membrane.

In the following, the method of forming the heat resistant insulating layer on the resinous porous base member will be described. First, inorganic particles and binder are dispersed in a solvent to prepare a dispersion liquid. Then, the dispersion liquid is applied to one surface or both surfaces of the resinous porous base member and the dispersion liquid applied base member is dried for forming the heat resistant insulating layer.

As the solvent for the dispersion liquid, there can be used N-methyl-2-pyrrolidone (NMP), dimethylformamide, dimethylacetamide, methylformamide, cyclohexane, hexane, water or the like. In case of using polyvinylidene fluoride as the binder (PVDF), it is preferable to use NMP as a solvent.

Then, the above-mentioned dispersion liquid is coated to the resinous porous base member. The method of this coating is not especially limited. For example, knife coater method, gravure coater method, screen printing method, meyer-bar method, die coater method, reverse roll coater method, ink-jet method, spraying method or the like can be used. By adjusting the amount of the dispersion liquid coated to the resinous porous base member, the above-mentioned coating ratio can be controlled to a predetermined range. One example is to adjust the amount of the dispersion liquid coated to the base member so that the coated amount of the heat resistant insulating layer shows about 5 to 20 g/m².

The temperature for removing the solvent after coating of the dispersion liquid is not especially limited. That is, the temperature is suitably set in accordance with a solvent used. If for example water is used as the solvent, the temperature is preferably 50 to 70° C. While, if NMP is used as the solvent, the temperature is preferably 70 to 90° C. If necessary, the solvent may be dried under decompression. Furthermore, if necessary, part of the solvent may be remained without removing entire amount of the solvent.

In the above, the heat resistant insulating layer-mounted separator which is a preferable example of the separator 17 has been explained in detail. However, the technical range of the invention is not limited to such example. In other words, even though a separator has a construction other than that of the heat resistant insulating layer-mounted separator, the separator can exhibit effects of the present invention so long as the separator satisfies required conditions defined by Claims.

The concrete value of the surface roughness (negative electrode active material layer side: Rzjis(2), positive electrode active material layer side: Rzjis(4)) of the surface of the separator 17 is not especially limited. That is, the surface roughness can be suitably adjusted so as to satisfy the above-mentioned regulations. However, Rzjis(2) and Rzjis (4) are each preferably 1.0 to 4.0 µm, more preferably 1.0 to 3.0 µm. Although Rzjis(2) and Rzjis(4) may be identical or different, it is preferable that they are identical.

[Positive Electrode Collector Plate and Negative Electrode Collector Plate]

Materials for the collector plates (25, 27) are not especially limited. That is, known high conductivity materials hitherto used as the materials for the collector plates of the lithium-ion secondary battery can be used. The preferable material for the collector plates is for example aluminum, cupper, titanium, nickel, stainless steel (SUS), alloy of these metals or the like. When considering from an aspect of light weight, corrosion resistance and high conductivity, more preferable material is aluminum and/or cupper, and most preferable material is aluminum. For the positive electrode collector plate 27 and the negative electrode collector plate 25, the same or different materials may be used.

[Positive Electrode Lead and Negative Electrode Lead]

Although not shown in the drawings, each electrode collector 11 and each of the collector plates (25, 27) may be electrically connected through a positive electrode lead or negative electrode lead. Materials for the positive and negative electrode leads can use materials that are commonly used in known lithium-ion secondary battery. Preferably, portions of the leads that are exposed from an outer cover are covered with heat resistant insulating and heat shrinkable tubes so as to prevent a short circuit with a peripheral device and wirings. Actually, such short circuit affects on products (for example, automotive parts, particularly, electronic devices).

[Outer Cover]

As is seen from FIG. 1, a laminate sheet 29 may be used as the outer cover. The laminate sheet has a three layered structure including for example a polypropylene film, an aluminum film and a nylon film that are laminated or put on one another in this order. In some cases, a conventionally used known metal can container may be used as the outer cover.

Embodiments

In the following, embodiments of the present invention will be concretely described. It is however to be noted that the technical range of the present invention is not limited to the following embodiments.

[Various Measuring Methods]

In the embodiments and comparative examples, the following methods were used for measuring the surface roughness (Rzjis) of a surface of a member and the dynamic friction coefficient of the member.

(Measurement of Surface Roughness (Rzjis))

By using a laser microscope, the surface roughness of a member (viz., separator or active material layer) was measured. Specifically, a surface of a part with the size 128 µm×100 µm was observed and a surface roughness (Rzjis) of the 128 µm range was measured from a line cross sectional profile at an arbitrary point.

(Measurement of Dynamic Friction Coefficient)

Obeying the friction coefficient measuring method defined in JIS No. k7125, an electrode (positive electrode or negative electrode) was put on a separator and a slide piece (200 g) was put on the electrode. Then, a load displacement was measured at the time when one end of the electrode was pulled at a speed of 100 mm/min by a tensile strength tester. The average (viz., load average value) of loads appeared at the positions 20 to 100 mm from a measuring start position was made as a dynamic friction force, and the dynamic friction force was divided by the normal force of the slide piece to calculate the dynamic friction coefficient.

First Embodiment

Production of Negative Electrode 96.5 wt. % artificial graphite (mean particle size: 15 μm) as a negative electrode active material and 3.5 wt. % polyvinylidene fluoride as a binder were dispersed in N-methyl-2-pyrrolidone (NMP) to produce a slurry.

With the aid of a die coater, the slurry was coated to one surface of a copper foil of 10 μm in thickness, and after being dried at 120° C. for 3 minutes, the slurry-coated copper foil was compression-molded by a roll press machine. For this process, the slurry coating amount and press condition were adjusted so that the application amount of solid content (active material and binder) of the negative electrode was 106 g/m² and the bulk density of the active material layer was 1.35 g/cm³.

The surface roughness (Rzjis(1)) of the surface of the negative electrode active material layer of the negative electrode produced in the above-mentioned manner was 5.91 μm.

(Production of Positive Electrode)

92.2 wt. % lithium cobalt composite oxide ($LiCoO_2$) as a positive electrode active material, 4.6 wt. % acetylene black as an electrically conductive material and 3.2 wt. % polyvinylidene fluoride as a binder were dispersed in N-methyl-2-pyrrolidone (NMP) to produce a slurry.

With the aid of a die coater, the slurry was coated to one surface of an aluminum foil of 20 μm in thickness, and after being dried at 130° C. for 3 minutes, the slurry-coated foil was compression-molded by a roll press machine. For this process, the slurry coating amount and the press condition were adjusted so that the application amount of solid content (active material, electrically conductive material and binder) of the positive electrode was 250 g/m² and the bulk density of the active material layer was 3.00 g/cm³.

The surface roughness (Rzjis(3)) of the surface of the positive electrode active material layer of the positive electrode produced in the above-mentioned manner was 2.46 μm.

(Preparation of Non-Aqueous Electrolyte)

In a mixed solvent of "ethylene carbonate:ethylmethyl carbonate=1:2 (volume ratio)", $LiPF_6$ as solute was dissolved by an amount that indicates a concentration of 1.0 mol/L. With this process, the non-aqueous electrolyte was prepared.

(Production of Separator)

A heat resistant insulating layer-mounted separator was produced which comprises a polyolefine resin porous membrane (thickness: 30 μm) obtained by effecting a biaxial stretching, and heat resistant insulating layers (thickness in each layer: 5 μm) respectively arranged on both surfaces of the porous membrane. Specifically, at first, 95 wt. % alumina particles (BET specific surface: 5 m²/g, mean particle size: 0.48 μm) as inorganic particles and 5 wt. % polyethylene as binder were dispersed in water to prepare a slurry. Then, with the aid of a gravure coater, the slurry was coated onto the polyolefine resin porous membrane (thickness: 16 μm), and then the slurry coated porous membrane was dried at 60° C. to remove water. With this process, the heat resistant insulating layer-mounted separator was produced.

The surface roughness of the surface of the separator produced in the above-mentioned manner was 1.38 μm in both surfaces (Rzjis(2) and Rzjis(4)). That is, the surface roughness ratio ($R_A$) between the surface of the separator and the surface of the negative electrode active material layer was represented by $R_A$=Rzjis(2)/Rzjis(1)=1.38/5.91=0.23, and the surface roughness ratio ($R_B$) between the surface of the separator and the surface of the positive electrode active material layer was represented by $R_B$=Rzjis(4)/Rzjis(3)=1.38/2.46=0.56. And the dynamic friction coefficient between the surface of the separator and the surface of the negative electrode active material layer was 0.27, and the dynamic friction coefficient between the surface of the separator and the surface of the positive electrode active material layer was 0.35.

Second Embodiment

For producing a heat resistant insulating layer-mounted separator of this second embodiment, substantially the same production process as that of the above-mentioned first embodiment was carried out except that for producing the heat resistant insulating layers, alumina particles of which BET specific surface is 15 m²/g and of which mean particle size is 0.55 μm were used as inorganic particles.

The surface roughness of the surface of the separator produced in the above-mentioned manner was 1.48 μm in both surfaces (Rzjis(2) and Rzjis(4)). That is, the surface roughness ratio ($R_A$) between the surface of the separator and the surface of the negative electrode active material layer was represented by $R_A$=Rzjis(2)/Rzjis(1)=1.48/5.91=0.25, and the surface roughness ratio ($R_B$) between the surface of the separator and the surface of the positive electrode active material layer was represented by $R_B$=Rzjis(4)/Rzjis(3)=1.48/2.46=0.60. And the dynamic friction coefficient between the surface of the separator and the surface of the negative electrode active material layer was 0.23, and the dynamic friction coefficient between the surface of the separator and the surface of the positive electrode active material layer was 0.35.

Third Embodiment

For producing a heat resistant insulating layer-mounted separator of this third embodiment, substantially the same production process as that of the above-mentioned first embodiment was carried out except that for producing the heat resistant insulating layers, alumina particles of which BET specific surface is 52 m²/g and of which mean particle size is 2.8 μm were used as inorganic particles.

The surface roughness of the surface of the separator produced in the above-mentioned manner was 2.97 μm in both surfaces (Rzjis(2) and Rzjis(4)). That is, the surface roughness ratio ($R_A$) between the surface of the separator and the surface of the negative electrode active material layer was represented by $R_A$=Rzjis(2)/Rzjis(1)=2.97/5.91=0.50, and the surface roughness ratio ($R_B$) between the surface of the separator and the surface of the positive electrode active material layer was represented by $R_B$=Rzjis(4)/Rzjis(3)=2.97/2.46=1.21. And the dynamic friction coefficient between the surface of the separator and the surface of the negative electrode active material layer was 0.22, and the dynamic friction coefficient between the surface of the separator and the surface of the positive electrode active material layer was 0.44.

Comparative Example

For producing this comparative example, substantially the same production process as that of the above-mentioned third embodiment was carried out except that as the negative electrode active material contained in the negative electrode active material layer, a material of which mean particle size is 12 μm was used.

The surface roughness (Rzjis(1)) of the surface of the negative electrode active material layer of the negative electrode produced in the above-mentioned manner was 3.34 μm. That is, the surface roughness ratio ($R_A$) between the surface of the separator and the surface of the negative electrode active material layer was represented by $R_A$=Rzjis(2)/Rzjis(1)=2.97/3.34=0.89, and the surface roughness ratio ($R_B$) between the surface of the separator and the surface of the positive electrode active material layer was represented by $R_B$=Rzjis(4)/Rzjis(3)=2.97/2.46=1.21. And the dynamic friction coefficient between the surface of the separator and the surface of the negative electrode active material layer was 0.19, and the dynamic friction coefficient between the surface of the separator and the surface of the positive electrode active material layer was 0.47.

As will be understood from Table-1, when the surface roughness ratio ($R_A$) between the negative electrode active material layer and the separator is within a predetermined range, the dynamic friction coefficient between the negative electrode active material layer and the separator can be controlled to a high value. Thus, in accordance with the present invention, it is expected that the occurrence of lamination misalignment can be effectively suppressed in a lamination step during production of the non-aqueous electrolyte secondary battery.

The invention claimed is:
1. A non-aqueous electrolyte secondary battery having a power generating element with a single-cell layer which includes:
   a positive electrode including a positive electrode active material layer formed on a surface of a positive electrode collector;
   a negative electrode including a negative electrode active material layer formed on a surface of a negative electrode collector; and
   a separator disposed between the positive electrode active material layer and the negative electrode active material layer in a manner to contact to the negative electrode active material layer, the separator having therein a non-aqueous electrolyte, wherein a value $R_A$ (=Rzjis(2)/Rzjis(1)) for the ratio between the surface roughness (Rzjis(1)) of the surface of the negative electrode active material layer on the side in contact with the separator and the surface roughness (Rzjis(2)) of the surface of the separator on the side in contact with the negative electrode active material layer is 0.15 to 0.85,
   wherein the separator is disposed between the positive electrode active material layer and the negative electrode active material layer in a manner to contact to the positive electrode active material layer,
   wherein a value $R_B$ (=Rzjis(4)/Rzjis(3)) for the ratio between the surface roughness (Rzjis(3)) of the surface of the positive electrode active material layer on the side in contact with the separator and the surface roughness (Rzjis(4)) of the surface of the separator on the side in contact with the positive electrode active material layer is greater than 0.15 and smaller than or equal to 1.5, and
   wherein the value $R_B$ is larger than the value $R_A$.

TABLE 1

| | ALUMINA PARTICLES BET SPECIFIC SURFACE m²/g | NEGATIVE ELECTRODE ACTIVE MATERIAL MEAN PARTICLE SIZE μm | $R_{zjis}(1)$ μm | $R_{zjis}(2)$ | | | | | DYNAMIC FRICTION COEFFICIENT | |
|---|---|---|---|---|---|---|---|---|---|---|
| | | | | $R_{zjis}(3)$ μm | $R_{zjis}(4)$ μm | $R_A$ | $R_B$ | NEGATIVE ELECTRODE | POSITIVE ELECTRODE |
| FIRST EMBODIMENT | 5 | 15 | 5.91 | 2.46 | 1.38 | 0.23 | 0.56 | 0.27 | 0.35 |
| SECOND EMBODIMENT | 15 | 15 | 5.91 | 2.46 | 1.48 | 0.25 | 0.60 | 0.23 | 0.35 |
| THIRD EMBODIMENT | 52 | 15 | 5.91 | 2.46 | 2.97 | 0.50 | 1.21 | 0.22 | 0.44 |
| COMPARATIVE EXAMPLE | 52 | 12 | 3.34 | 2.46 | 2.97 | 0.89 | 1.21 | 0.19 | 0.47 |

2. A non-aqueous electrolyte secondary battery as claimed in claim 1, in which the separator is a heat resistant insulating layer-mounted separator which comprises:
   a porous base layer; and
   a heat resistant insulating layer that is formed on one or both surfaces of the porous base layer and includes inorganic particles and a binder.

3. A non-aqueous electrolyte secondary battery as claimed in claim 1, in which the value RB is equal to or larger than 0.5.

4. A non-aqueous electrolyte secondary battery as claimed in claim 2, in which the value RB is equal to or larger than 0.5.

* * * * *